United States Patent
Bavaresco et al.

(10) Patent No.: US 12,129,916 B1
(45) Date of Patent: Oct. 29, 2024

(54) LOCKING DIFFERENTIAL ASSEMBLY AND OPERATING METHOD

(71) Applicant: DANA ITALIA S.R.L., Trentino (IT)

(72) Inventors: Federico Bavaresco, San Zeno di Montagna (IT); Giulio Vellere, Rovereto (IT)

(73) Assignee: DANA ITALIA S.R.L., Trentino (IT)

( * ) Notice: Subject to any disclaimer, the term of this patent is extended or adjusted under 35 U.S.C. 154(b) by 0 days.

(21) Appl. No.: 18/342,501

(22) Filed: Jun. 27, 2023

(51) Int. Cl.
*B60K 17/16* (2006.01)
*F16H 48/06* (2006.01)
*F16H 48/20* (2012.01)
*F16H 48/24* (2006.01)
*F16H 48/32* (2012.01)
*B60K 17/35* (2006.01)
*B60K 23/04* (2006.01)

(52) U.S. Cl.
CPC ........... *F16H 48/32* (2013.01); *B60K 17/165* (2013.01); *F16H 48/06* (2013.01); *F16H 48/24* (2013.01); *B60K 17/35* (2013.01); *B60K 23/04* (2013.01); *F16H 2048/204* (2013.01); *F16H 2048/205* (2013.01)

(58) Field of Classification Search
CPC ..... F16H 4/06; F16H 4/24; F16H 4/32; F16H 2048/204; F16H 2048/205; B60K 17/165; B60K 17/35; B60K 23/04; B60W 30/02; B60W 30/045; B60W 2710/207
See application file for complete search history.

(56) References Cited

U.S. PATENT DOCUMENTS

| | | | |
|---|---|---|---|
| 4,159,656 A | 7/1979 | Tomich | |
| 4,955,853 A * | 9/1990 | Bausch | F16H 48/24 475/237 |
| 6,038,506 A * | 3/2000 | Diekhans | B60K 23/04 701/88 |
| 6,755,763 B1 * | 6/2004 | Goto | F16H 48/34 475/237 |
| 8,051,744 B2 | 11/2011 | Bawks | |
| 8,265,842 B2 * | 9/2012 | Povirk | F16H 48/30 701/67 |
| 11,460,098 B2 * | 10/2022 | Bhurke | F16H 48/34 |
| 2003/0121750 A1 * | 7/2003 | Teraoka | F16H 48/22 192/93 A |
| 2005/0167228 A1 * | 8/2005 | Baxter, Jr. | F16H 48/30 192/48.8 |
| 2011/0269595 A1 * | 11/2011 | Marsh | F16H 48/30 475/220 |
| 2017/0327108 A1 * | 11/2017 | Monticello | B60K 23/04 |
| 2019/0136952 A1 * | 5/2019 | Garcia | F16H 48/34 |

FOREIGN PATENT DOCUMENTS

| | | | | |
|---|---|---|---|---|
| DE | 0143975 A2 * | 6/1985 | | B60K 17/35 |
| WO | WO-2012161648 A1 * | 11/2012 | | B60K 23/04 |

* cited by examiner

*Primary Examiner* — Tinh Dang
(74) *Attorney, Agent, or Firm* — McCoy Russell LLP

(57) ABSTRACT

Systems and methods for a locking differential assembly. The locking differential assembly, in one example, includes an input gear configured to rotationally couple to an upstream component, a case coupled to the input gear, and a locking clutch configured to, in an engaged configuration, lock rotation of the case and a side gear. The locking differential assembly further includes an actuation system configured to engage and disengage the locking clutch based on a steering angle.

17 Claims, 4 Drawing Sheets

LOCKING DIFFERENTIAL ASSEMBLY AND OPERATING METHOD

TECHNICAL FIELD

The present disclosure relates to a locking differential assembly with a locking clutch and a method for operation of the locking clutch.

BACKGROUND AND SUMMARY

Some drivelines have made use of limited slip differentials to increase traction performance of the vehicle when compared to open differentials. Limited slip differentials allow a difference in the angular velocity of output shafts but impose constraints in the angular velocity variance. Clutches packs in side gears of the limited slip differentials are used to accomplish this functionality. Other fully locking differential have been used in certain vehicles to further increase traction performance by rotationally locking the side gears together.

U.S. Pat. No. 8,051,744 B2 to Bawks et al. discloses a locking differential system for supplying power to output shafts. The locking differential system includes springs that automatically engage and disengage torsional joints depending on a speed difference between the side gears.

The inventors have recognized several drawbacks with Bawks' locking differential and other previous differential systems. For instance, certain components in Bawks' locking differential demand complex manufacturing techniques. For instance, the shape of the components and the spring characteristics for engagement and disengagement of the locking function may be difficult to achieve in manufacturing. Further, the inventors have recognized that it may be desirable to unlock the differential at comparatively high vehicle speeds to reduce the chance degradation of certain components in the differential.

Facing the abovementioned issues, the inventors developed a locking differential assembly to overcome at least a portion of the issues. The locking differential assembly, in one example, includes an input gear configured to rotationally couple to an upstream component and a case coupled to the input gear. The locking differential assembly further includes a locking clutch configured to, in an engaged configuration, lock rotation of the case and a side gear. The locking differential assembly even further includes an actuation system configured to engage and disengaged the locking clutch based on a steering angle. In this way, the vehicle's steering angle is able to trigger locking and unlocking of the differential to allow the differential to function as an open differential when the vehicle is traveling on a curve and when the vehicle is traveling in a relatively straight line to lock the opposing axle shafts such that they rotate at the same speed to increase traction. Further, the aforementioned functionality is able to be achieved in a reliable and space efficient package that is efficient to manufacture. Furthermore, the assembly allows a locking differential to achieve the additional functionality of locking the differential, increasing the flexibility of the production by adding complexity to the differential's control scheme rather than the differential's architecture, if desired.

Further, in one example, the actuation system may include a hydraulic valve which is in hydraulic communication with a hydraulic actuator of the locking clutch. The hydraulic valve may be actively adjusted via a controller, in one example, or may be mechanically adjusted by a steering mechanism, in another example. In this way, the locking clutch is able to be reliably actuated using vehicle steering angle as a disengagement condition. Further, when the hydraulic valve is adjusted using controller commands, active locking and unlocking strategies may be utilized. For instance, the locking clutch may be actively disengaged when a vehicle speed surpasses a threshold value. As a result, the chance of component degradation in the differential is decreased, thereby increasing differential longevity.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A reliable and space efficient locking differential assembly that exhibits active locking functionality is provided herein. The locking differential includes a locking clutch which is capable of active adjustment based on the vehicle's steering angle using an actuation system. The actuation system may include a hydraulic valve that triggers adjustment of a hydraulic actuator of the locking clutch. A controller or steering mechanism may be used to command adjustment of the hydraulic valve for locking clutch engagement and disengagement.

Figure 1:
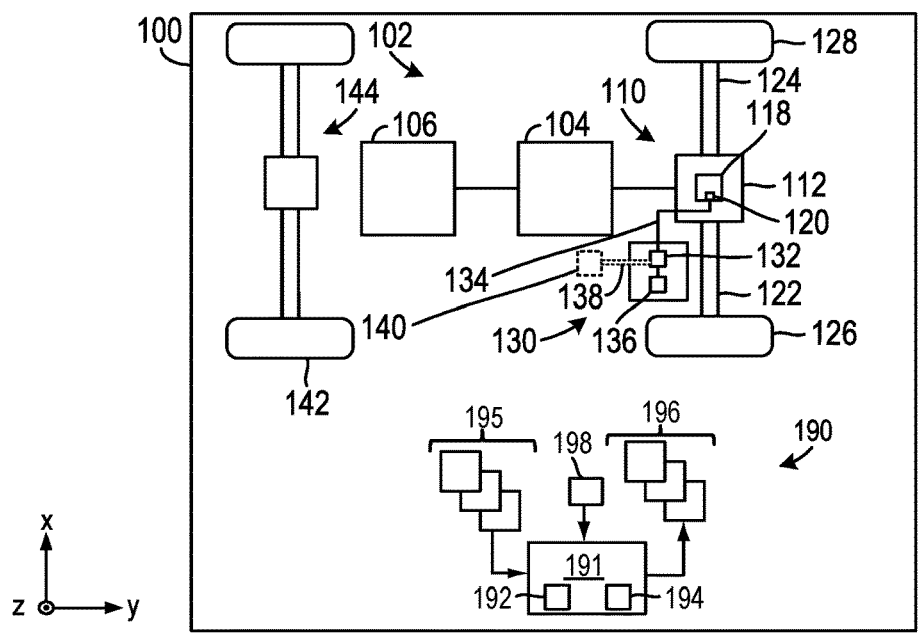
FIG. 1 shows a schematic depiction of a vehicle that includes a powertrain with a locking differential assembly.

FIG. 1 shows a schematic illustration of a vehicle 100. The vehicle may be a passenger vehicle, a commercial vehicle, an on-highway vehicle, or an off-highway vehicle, in different examples. In the off-highway vehicle example, the vehicle's size and/or maximum speed may preclude it from operating on highways. For instance, the vehicle's width may be greater than a highway lane and/or the maximum vehicle speed may be less than a minimum highway speed. However, in other examples, the vehicle may be an on-highway vehicle such as a commercial or passenger vehicle.

In the vehicle example, the vehicle 100 includes a powertrain 102 with a transmission 104 (e.g., gearbox) and a prime mover 106 (e.g., an internal combustion engine and/or an electric motor). When the prime mover is an electric motor, the motor may be included in an electric drive system. The prime mover 106 delivers mechanical power to the transmission during powertrain operation. In the case of electric drives, power may flow from the transmission to the electric motor while the motor is operated as a generator.

Further, the transmission 104 is mechanically coupled to a drive axle assembly 110. The drive axle assembly 110 may include a locking differential assembly 112, axle shafts 122 and 124, and/or drive wheels 126 and 128.

The transmission 104 may include gears, shafts, and the like which may function to alter the speed of the mechanical input from the prime mover for speed changes at the transmission output. The transmission may be a multi-speed transmission, a continuously variable transmission, a single speed transmission, and the like.

The locking differential assembly 112 includes a locking clutch 118 which may include an actuator 120 (e.g., a hydraulic actuator). The actuator 120 is configured to engage and disengage the locking clutch 118 to lock and unlock the differential. When locked, the differential the axle shafts 122 and 124 rotate at the same speed. The axle shafts 122, 124 are rotationally coupled to drive wheels 126 and 128. Conversely, when the differential is unlocked speed variance between the axle shafts 122, 124 is permitted. As such, the locking differential may function as an open differential when unlocked.

The actuator 120 may be adjusted via an actuation system 130. The working fluid in the actuation system may be oil, in one example. The actuation system 130 may include a hydraulic valve 132 which is hydraulically coupled to the actuator 120 via a fluid line 134. The actuation system 130 may include a fluid source 136 (e.g., a pump). In one example, the hydraulic valve 132 may be actively electronically controlled via commands from a controller 191 which is discussed in greater detail herein. To elaborate, a steering signal from a controller may be used to actuate the hydraulic valve 132. For instance, a steering signal indicative of the steering angle being greater than a threshold value may close the hydraulic valve and a steering single indicative of the steering angle being less than the threshold value may open the valve. The actuation system 130 may automatically lock and unlock the locking clutch 118 without operator interaction with an input device which triggers adjustment in the differential's locking clutch position. However, in certain examples, an operator may additionally be able to lock and unlock the locking clutch via an input device which may override the automatic locking and locking control strategy or vice versa.

Additionally or alternatively, the hydraulic valve 132 may be mechanically actuated via a mechanical device 138 (e.g., a shaft, a cam, a rod, combinations thereof and the like) that is coupled to or incorporated into a steering mechanism 140. In this case, for example, the valve may be activated by a lever, integrated in the valve: the lever is moved by one of the steering mechanism components when the vehicle start to steer, and come back in the neutral position once the steering angle become zero. In this way the valve configuration is mechanical linked at the steering mechanism configuration, looking the device when the vehicle is not steering and opening it when the vehicle is steering.

Figure 6:
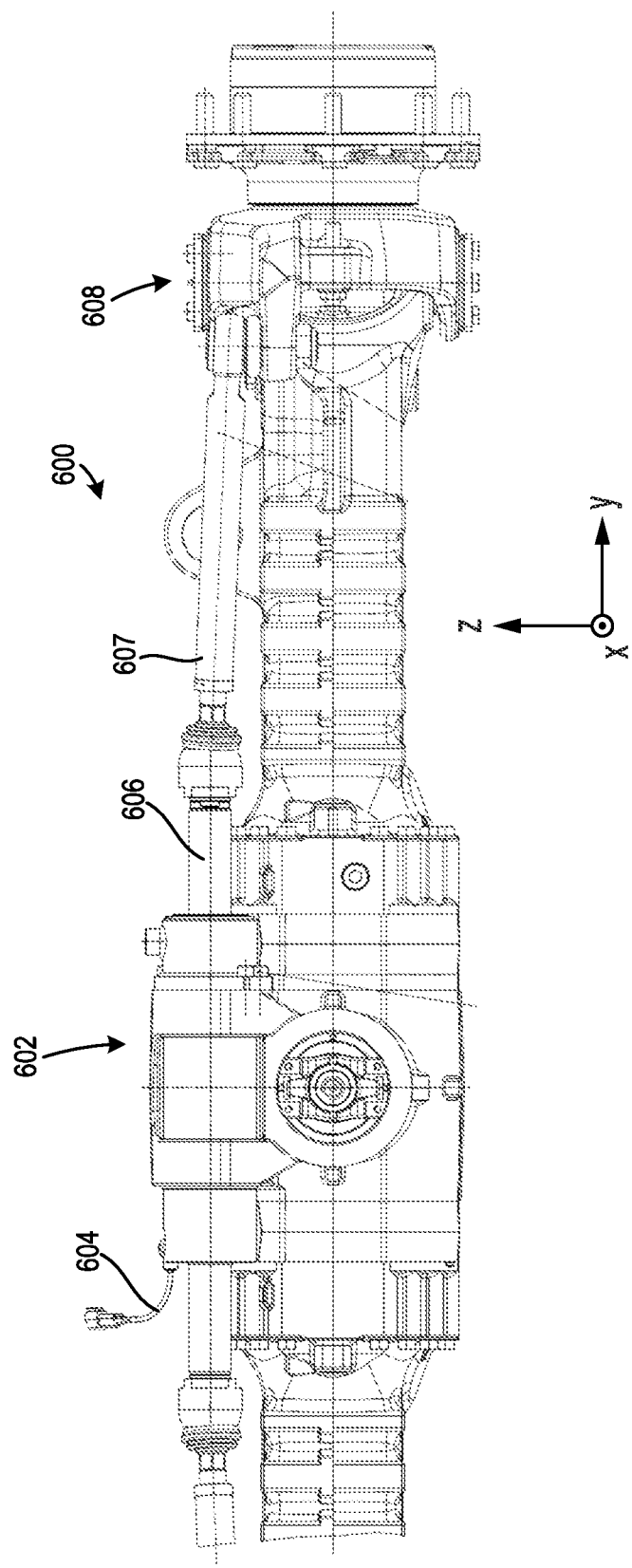
FIG. 6 shows a steering mechanism for an axle assembly.

An example of a steering mechanism 600 is illustrated in FIG. 6. The steering mechanism 600 may include a hydraulic piston 602 that selectively receives hydraulic fluid from a fluid line 604 or other suitable component. The hydraulic piston 602 alters the position of rods 606 that adjust steering knuckles 608 via tie rods 607. To elaborate, the tie rods may be pushed or pulled to rotate the steering knuckles.

Continuing with FIG. 1, the steering mechanism 140 may be configured to change the steering angle of wheels 142 in an axle assembly 144. The steering mechanism 140 may include components such as an input device (e.g., steering wheel), a pinion gear, a steering column, and the like for altering the steering angle of the wheels 142. In other examples, the steering mechanism 140 may be configured to alter the steering angle of the wheels 124, 126.

The locking differential assembly 112 is schematically depicted in FIG. 1. However, it will be appreciated that the differential and locking device has greater structural and functional complexity that is expanded upon herein with regard to the exemplary clutch assembly depicted in FIGS. 2-4.

As illustrated in FIG. 1, the prime mover 106, the transmission 104, and the drive axle assembly 110 are spaced away from one another. However, it will be appreciated that one or more of these components may be collocated with one another in an assembly. For instance, when the vehicle is an electric vehicle, the electric motor, the transmission, and the axle assembly may form an electric axle, in other examples.

The vehicle 100 may further include a control system 190 with a controller 191 (e.g., driveline control unit (DCU)), as shown in FIG. 1. The controller 191 may include a microcomputer with components such as a processor 192 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions that are executable by the processor for performing the methods and control techniques described herein as well as other variants that are anticipated but not specifically listed. As such, the control techniques, methods, and the like expanded upon herein may be stored as instructions in non-transitory memory.

The controller 191 may receive various signals from sensors 195 coupled to various regions of the vehicle 100. For example, the sensors 195 may include a pedal position sensor designed to detect a depression of an operator-actuated pedal such as an accelerator pedal and/or a brake pedal, speed sensor(s) at the transmission input and/or output shaft, gear selector sensor, clutch position sensors, and the like. An input device 198 (e.g., accelerator pedal, brake pedal, drive mode selector, gear selector, combinations thereof, and the like) may further provide input signals indicative of an operator's intent for vehicle control.

Upon receiving the signals from the various sensors 195 of FIG. 1, the controller 191 processes the received signals, and employs various actuators 196 of system components to adjust the components based on the received signals and instructions stored on the memory of controller 191. For example, the controller 191 may be designed to engage and disengage the locking device. For instance, the controller 191 may determine that the differential should be locked and send a locking control command to the valve 132. The other controllable components in the system may function in a similar manner with regard to sensor signals, control commands, and actuator adjustment, for example.

An axis system is provided in FIG. 1 as well as FIGS. 2-4 and 6, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

Figure 2:
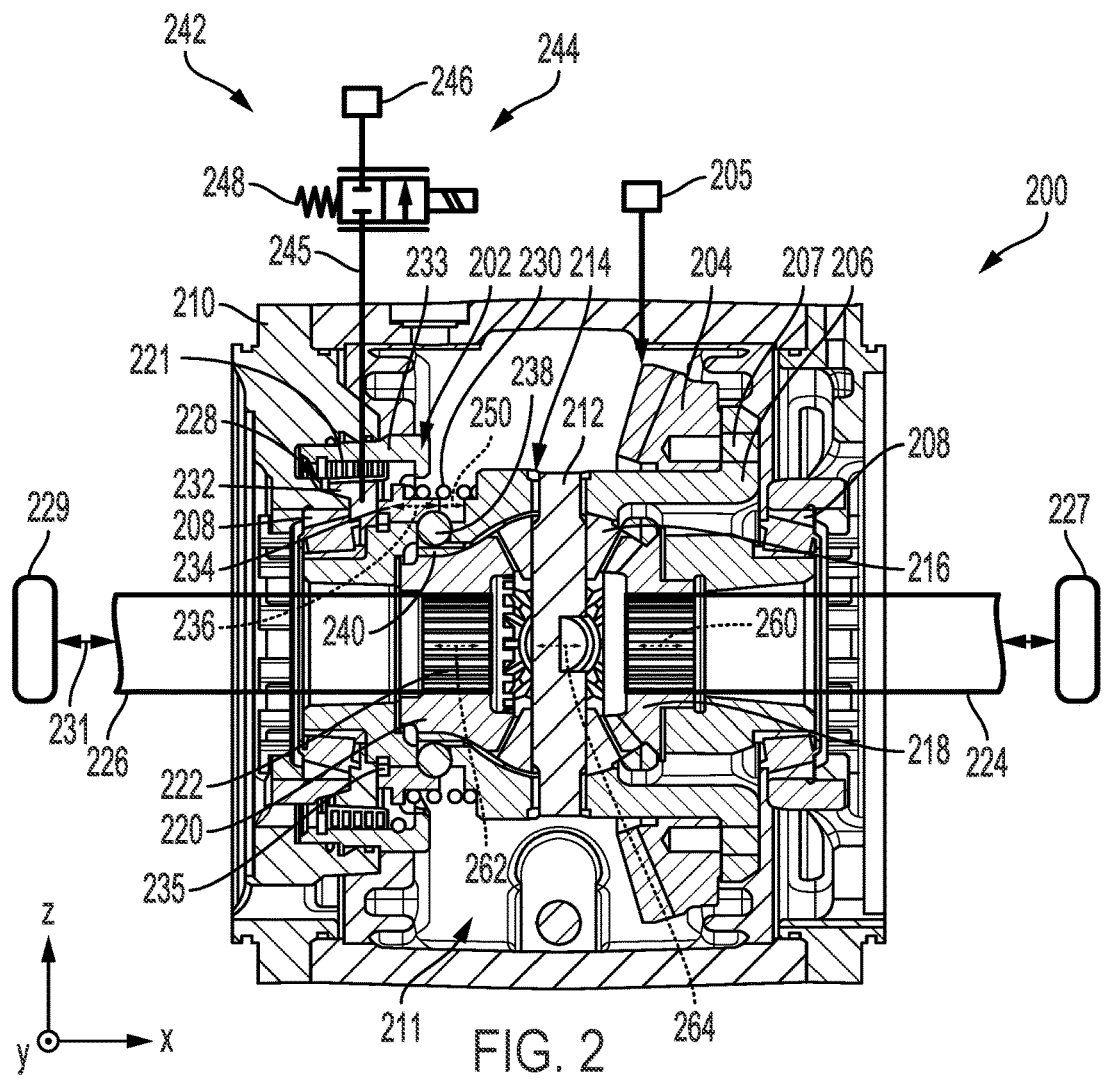
FIG. 2 shows an example of a locking differential assembly in a disengaged configuration.
Figure 3:
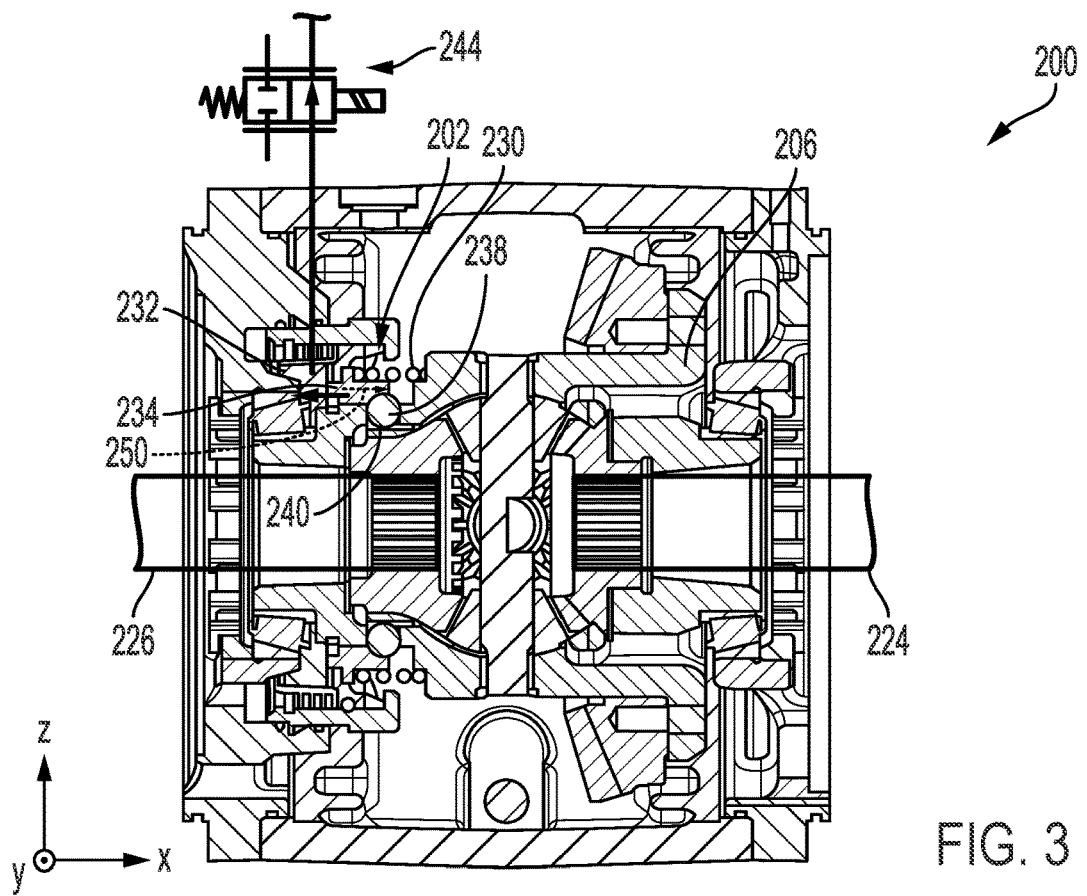
FIG. 3 shows the locking differential assembly, depicted in FIG. 2, in a transient condition between the disengaged configuration and an engaged configuration.
Figure 4:
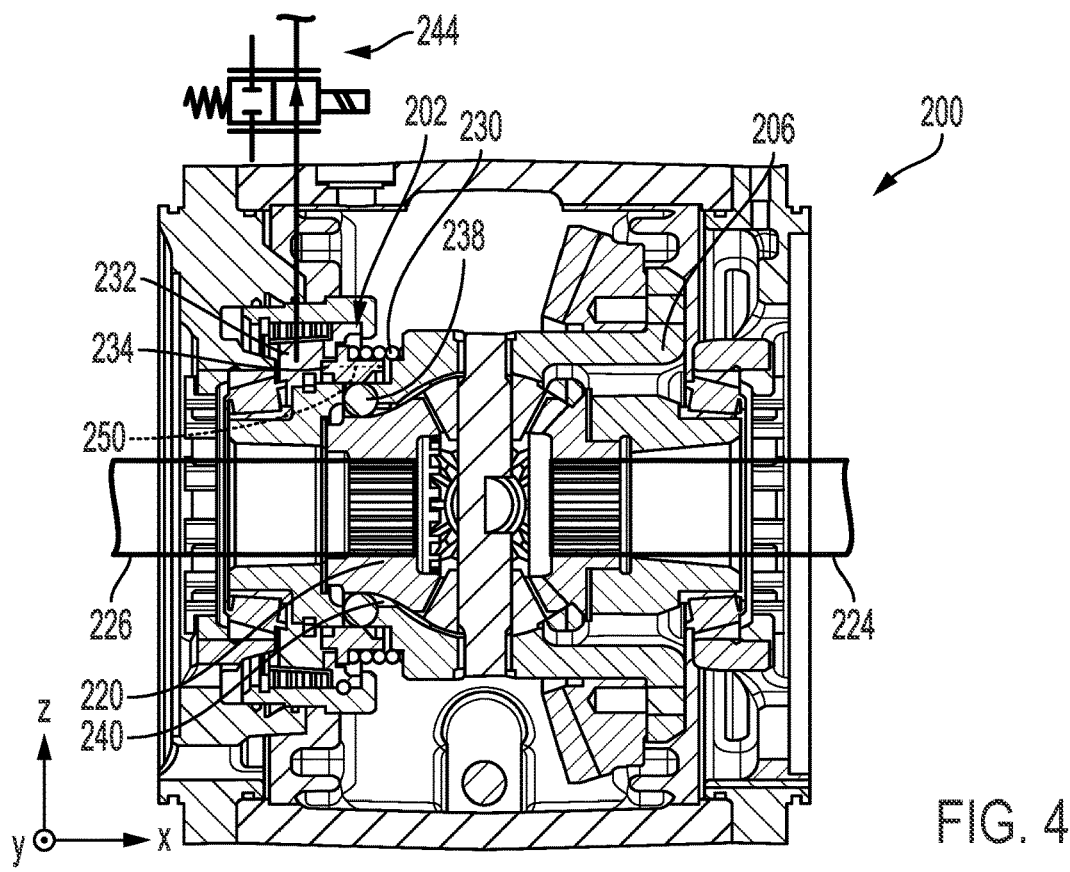
FIG. 4 shows the locking differential assembly, depicted in FIG. 2, in an engaged configuration.

FIGS. 2-4 show an example of a locking differential assembly 200. The locking differential assembly 200 is an example of the locking differential assembly 112, depicted in FIG. 1.

Turning specifically to FIG. 2 in which the locking differential assembly 200 is illustrated in an unlocked configuration where a locking clutch 202 is disengaged. The locking differential assembly 200 includes an input gear 204 (e.g., a ring gear) which is profiled to attach to an upstream component 205 such as a pinion gear that is coupled to a drive shaft which is coupled to a transmission, for instance. As described herein, input and output discussed in relation to the locking differential assembly correspond to a mode of differential operation when mechanical power is being transferred from an upstream driveline component through the differential and then to the drive wheels. However, it will be understood that power may flow in the opposite direction, under certain conditions and powertrain architectures. For instance, in the case of an electric powertrain, mechanical power may be transferred from the drive wheels through the differential to upstream component during regeneration operation.

The input gear 204 may be coupled to a case 206. For instance, an attachment device 207 may be used to fixedly couple the input gear 204 to the case 206 such that the rotate in unison. However, other suitable attachment techniques may be used to attach the input gear 204 to the case 206 such as welding, interference fitting, combinations thereof, and the like. Alternatively, the input gear 204 may be formed in the case 206 via machining, for instance.

Bearings 208 (e.g., tapered roller bearings) may be coupled to the case 206 and a housing 210. The bearings 208 permit the case 206 to rotate within the housing 210. The bearing described herein may include races (e.g., inner and outer races) and roller elements (e.g., balls, cylindrical rollers, tapered cylindrical rollers, and the like). The housing 210 may include a sump 211 which collects oil or other suitable lubricant.

The locking differential assembly 200 may further include a shaft 212 (e.g., a pinion shaft) which is coupled to the case 206 via openings 214 and/or other suitable techniques. As such, the case 206 drive rotation of the case when the drive axle is in operation and delivering power to the drive wheels.

The locking differential assembly 200 may further include pinion gears 216 which may be referred to as spider gears. The pinion gears 216 mesh with side gears 218, 220. The side gears 218, 220 include mechanical interfaces 222 (e.g., splines) which allow the axle shafts 224, 226 (e.g., output shafts) to be rotationally attached thereto. The axle shafts 224, 226 are rotationally coupled to drive wheels 227, 229 as indicated via arrows 231.

When the locking clutch 202 is disengaged, as illustrated in FIG. 2, the speed of the side gears 218, 220 and therefore the axle shafts 224, 226 is allowed to vary. Thus, when the locking clutch is disengaged and the differential is in an unlocked configuration, the differential functions as an open differential. It is desirable to place the differential in an unlocked configuration, when the vehicle is turning. Conversely, it is desirable to place the differential in a locked configuration, when the vehicle is traveling substantially straight to increase the axle traction. An operating method for the locking differential is expanded upon herein with regard to FIG. 5.

As shown in FIG. 2, the locking clutch 202 may include a hydraulic actuator 228. The hydraulic actuator 228 may include a spring 230, a hydraulic chamber 232 (e.g., a piston chamber) which adjusts the position of a piston 234. The spring 230 is coupled to the piston 234 and the case 206 in the illustrated example. However, other clutch configuration may be used in alternate embodiments. The hydraulic chamber 232 may be at least partially bounded via an outer wall 233, one of the bearings 208.

The piston 234 may be splined to the case 206 in one example which allows the piston to translate along an axis 236. A retaining ring 235 may be used to constrain the axial movement of the piston 234.

During actuation, the piston 234 moves along the axis 236. Movement of the piston 234 allows locking components 238 (e.g., locking spheres) to move radially inward and outward (in relation to a rotational axis 264 of the case 206) to lock the case for rotation with the side gear 220. To elaborate, the locking components 238 which are in the form of spheres may mate with recesses 240 in the side gear 220, when the locking clutch is engaged, as shown in FIG. 4. To elaborate, a ramp in the piston may be actuated to push the locking components 238 radially inward into the recess 240 in the side gear. The locking clutch 202 may further include a spring 221. Engaging the locking clutch 202 therefore locks the side gears such that they rotate in unison along with the axle shafts, thereby increasing axle traction.

An actuation system 242 may be used alter the configuration of the hydraulic actuator 228. For instance, the actuation system 242 may include a hydraulic valve 244. The hydraulic valve may be a two position solenoid valve, in one specifically example. However, other valve designs may be used in other examples. A closed position of the hydraulic valve is depicted in FIG. 2 in which fluid flow from a fluid source 246 to the hydraulic actuator 228 is inhibited by the valve. As such, fluid pressure in the hydraulic chamber 232 is below a threshold pressure. For instance, the fluid pressure in the chamber 232 may be around 0 bar when the hydraulic valve 244 is closed, in one use-case example. Conversely, the hydraulic valve 244 may be placed in an open configuration where the hydraulic chamber 232 sees a higher pressure that induces locking clutch engagement (e.g., 15-30 bar, in one use-case example).

The hydraulic valve 244 may be electronically and/or mechanically adjusted between an open and closed position. For instance, a controller (e.g., the controller 191, shown in FIG. 1) may command adjustment of the hydraulic valve 244 and/or a steering mechanism may be mechanically coupled to the hydraulic valve 244 for adjustment.

The fluid source 246 may provide fluid to the hydraulic valve in a range of pressures. For instance, the pressure supplied to the hydraulic valve 244 may be in the range of 15-30 bar, in one use-case example. The hydraulic valve 244 may additionally include a spring 248. The hydraulic valve 244 is hydraulically coupled to the hydraulic chamber 232 via a hydraulic conduit 245.

The constant of the spring 230 may dictate the pressure at which fluid in the chamber 232 moves the piston 234 in a direction 250. In one specific use-case example, chamber pressures in the range of 15-30 bar may induce movement of the piston 234 in the direction 250. Rotational axes 260, 262 of the side gears 218, 220, respectively and the rotational axis 264 of the case 206 and other differential components, are provided for reference in FIG. 2.

FIG. 3 shows the locking clutch 202 of the locking differential assembly 200 in a transient configuration where the pressure in the chamber 232 has been increased but the locking clutch remains disengaged. To increase the pressure in the hydraulic chamber 232, the valve 244 is switched into an open position where fluid is allowed to flow through the hydraulic valve into the hydraulic chamber 232. The spring 230 is at a minimum compression (e.g., substantially uncompressed) in the clutch configuration depicted in FIG. 3. The transient configuration will occur when the speed difference between the axle shafts 224, 226 is greater than a threshold. As the axle shaft speed difference falls below the threshold, the locking clutch 202 engages such that the piston 234 moves in direction 250 to push the locking components 238 radially inward to mate with the recesses 240.

FIG. 4 shows the locking clutch 202 of the locking differential assembly 200 in an engaged configuration. As indicated above, to place the locking clutch 202 in the engaged configuration, the hydraulic valve 244 is moved from a closed configuration to an open configuration to increase the pressure in the hydraulic chamber 232. The increase in the chamber pressure urges the piston 234 in the direction to move the locking components 238 radially inward such that they mate with the recesses 240 and lock the case 206 for rotation with the side gear 220. As the piston 234 moves in the direction 250, the spring 230 compresses and may be at its maximum compression, as illustrated in FIG. 4. However, other clutch architectures have been contemplated. In this way, the differential is locked such that the axle shafts 224, 226 rotate at the same speed. Consequently, the vehicle's traction performance is increased. Conversely, to transition the locking clutch 202 back into the disengaged position, the pressure in the hydraulic chamber 232 may be decreased such that the spring 230 decompresses and moves the piston 234 to allow the locking components 238 to decouple from the recesses 240.

Figure 5:
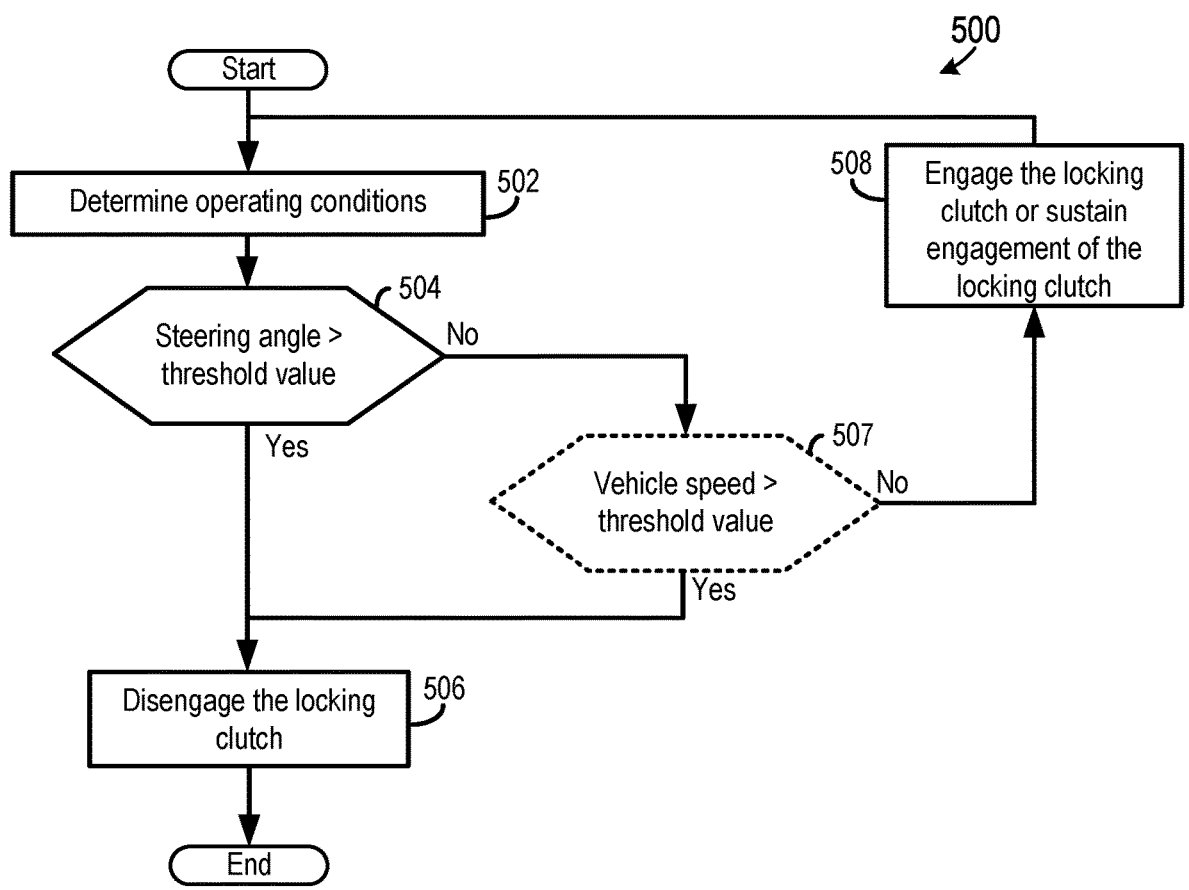
FIG. 5 shows a method for operation of a differential assembly.

FIG. 5 shows a method 500 for operation of a locking differential assembly. The method 500 may be carried out by any of the locking differential assemblies and associated mechanisms, systems, etc. or combinations of the locking differential assemblies and associated systems described herein with regard to FIGS. 1-4, in one example. In other examples, the method 500 may be implemented by other suitable locking differential assemblies. Furthermore, the method 500 may be implemented by a controller that includes memory holding instructions for the method steps that are executable by a processor, as previously indicated. However, certain method steps may be passively implemented in some examples, such as when the hydraulic actuation valve for the locking clutch is mechanically coupled to a steering mechanism.

The method 500 illustrated in FIG. 5 includes at 502, determining operating conditions. The operating conditions may include locking clutch position, vehicle speed, vehicle steering angle, accelerator pedal position, transmission input/output speed, vehicle load, ambient temperature, combinations thereof, and the like. The operating conditions may be ascertained via sensor inputs, modeling, look-up tables, and/or other suitable techniques. For instance, the vehicle speed may be measured via speed sensor in the drive wheels and the steering angle may be measured via sensors in the steering system.

At 504, the method includes determining if the steering angle is greater than a threshold value (e.g., a non-zero value). As such, a comparison may be made between the vehicle's steering angle determined at step 502 and the predetermined threshold steering angle. If it is determined that the steering angle is greater than the threshold value (YES at 504), the method moves to 506 where the method includes disengaging the locking clutch. As previously indicated, the locking clutch may be actively disengaged via a control command which is sent to a hydraulic valve which in turn triggers adjustment of a hydraulic actuator for the locking clutch. To elaborate, the hydraulic valve may be closed to decrease fluid pressure in the clutch's hydraulic chamber such that the clutch piston moves into a disengaged position or is sustained in a disengaged position. Additionally or alternatively, a steering mechanism may be used to mechanically actuate the hydraulic valve.

Conversely, if it is determined that the steering angle is not greater than the threshold value (NO at 504) the method moves to 506. It will be appreciated that step 506 may optionally be included in method 500. If step 506 is omitted from the method, if it is determined that the steering angle is not greater than the threshold value (NO at 504) the method moves to 508.

At 507, the method includes determining if the vehicle speed is greater than a threshold value (e.g., a non-zero value). Therefore, a comparison may be made between the vehicle speed determined at step 502 and the predetermined threshold vehicle speed.

If it is determined that the vehicle speed is greater than the threshold value (YES at 507), the method moves to 506. On the other hand, if it is determined that the vehicle is not greater than the threshold value (NO at 507), the method moves to 508.

At 508, the method includes engaging the locking clutch or sustaining engagement of the locking clutch. For instance, the pressure of the hydraulic fluid delivered to the clutch actuator via a hydraulic valve may be increased or sustained at a relatively high pressure (e.g., 15-30 bar, in one use-case example). Method 500 enables the vehicle's traction performance to be increased by allowing the differential locker to be engaged and disengaged using vehicle steering angle, and vehicle speed, in some cases.

The technical effect of the method for locking differential assembly operation described herein is to efficiently lock and unlock the differential based on steering angle and/or vehicle speed to increase traction performance in a space efficient and reliable package.

FIGS. 2-4 and 6 are drawn approximately to scale, aside from the schematically depicted components. However, other relative component dimensions may be used in alternate examples.

FIGS. 1-4 and 6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such. Still further, an axis about which a component rotates may be referred to as a rotational axis. Components fixedly coupled to one another may be referred to as such.

The invention will be further described in the following paragraphs. In one aspect, a locking differential assembly is provided that comprises an input gear configured to rotationally couple to an upstream component; a case coupled to the input gear; a locking clutch configured to, in an engaged configuration, lock rotation of the case and a first side gear; and an actuation system configured to engage and disengage the locking clutch based on a steering angle.

In another aspect, a method for operation of a locking differential assembly is provided that comprises disengaging a locking clutch in the locking differential assembly in response to a steering angle surpassing a threshold value; wherein the locking differential assembly includes: an input gear configured to rotationally couple to an upstream component; a case coupled to the input gear; and the locking clutch which is configured to, in an engaged configuration, lock rotation of the case and a first side gear. In one example, the method may further include disengaging the locking clutch in response to a vehicle speed surpassing a threshold value. Still further, in one example, the method may further include engaging the locking clutch in response to the steering angle decreasing below the threshold value.

In yet another aspect, a locking differential assembly is provided that comprises an input gear configured to rotationally couple to an upstream component; a case coupled to the input gear; a locking clutch configured to, in an engaged configuration, lock rotation of the case and a first side gear; an actuation system including a hydraulic valve which is hydraulically coupled to a hydraulic actuator of the locking clutch; wherein the hydraulic actuator is configured to engage and disengage the locking clutch; and wherein the actuation system is configured to selectively disengage the locking clutch based on a steering angle and/or vehicle speed.

In any of the aspects or combinations of the aspects, the actuation system may include a controller configured to: send a command to a hydraulic valve that is in hydraulic communication with a hydraulic actuator of the locking clutch.

In any of the aspects or combinations of the aspects, the controller may include instructions that when executed cause the controller to: disengage the locking clutch when the steering angle surpasses a threshold value.

In any of the aspects or combinations of the aspects, the controller may include instructions that when executed cause the controller to: disengage the locking clutch when a vehicle speed surpasses a threshold value.

In any of the aspects or combinations of the aspects, the actuation system may include a mechanical device configured alter a configuration of a hydraulic valve that is in hydraulic communication with a hydraulic actuator of the locking clutch.

In any of the aspects or combinations of the aspects, the mechanical device may be coupled to a steering mechanism.

In any of the aspects or combinations of the aspects, the locking clutch may include a plurality of spherical balls that are profiled to mate with recesses in the first side gear.

In any of the aspects or combinations of the aspects, the assembly may further comprise a plurality of pinion gears which mesh with the first side gear and a second side gear, wherein the first side gear is rotationally coupled to a first axle shaft and the second side gear is rotationally coupled to a second axle shaft.

In any of the aspects or combinations of the aspects, the locking differential assembly may be included in an off-highway vehicle.

In any of the aspects or combinations of the aspects, the locking differential assembly may further comprise an actuation system configured to engage and disengage the locking clutch based on the steering angle.

In any of the aspects or combinations of the aspects, the actuation system may a controller configured to change a position of a hydraulic valve which is in fluidic communication with a hydraulic actuator coupled to the locking clutch.

In any of the aspects or combinations of the aspects, the hydraulic actuator may engage the locking clutch when a pressure in a chamber of the hydraulic actuator is greater than a threshold value.

In any of the aspects or combinations of the aspects, the actuation system may include a controller that includes instructions that when executed cause the controller to: disengage the locking clutch in response to the steering angle exceeding a threshold value.

In any of the aspects or combinations of the aspects, the controller may include instructions that when executed cause the controller to: disengage the locking clutch in response to the vehicle speed exceeding a threshold value.

In any of the aspects or combinations of the aspects, the controller may include instructions that when executed cause the controller to: engage the locking clutch in response to: the steering angle decreasing below the threshold value; and the vehicle speed decreasing below the threshold value.

In another representation, a locking differential in a driveline is provided that comprises a locking device with a hydraulic piston which selectively locks rotation of a case and a side gear via a plurality of spheres and detents in the case based on a steering angle and/or a vehicle speed.

Note that the example control and estimation routines included herein can be used with various system (e.g., transmission) configurations. The control methods and routines disclosed herein may be stored as executable instructions in non-transitory memory and may be carried out by the control system including the controller in combination with the various sensors, actuators, and other system hardware in combination with the electronic controller. As such, the described actions, operations, and/or functions may graphically represent code to be programmed into non-transitory memory of the computer readable storage medium in the vehicle and/or powertrain control system. The various actions, operations, and/or functions illustrated may be performed in the sequence illustrated, in parallel, or in some cases omitted. Likewise, the order of processing is not necessarily required to achieve the features and advantages of the examples described herein, but is provided for case of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of traction motors, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A locking differential assembly, comprising:
   an input gear configured to rotationally couple to an upstream component;
   a case coupled to the input gear;
   a locking clutch configured to, in an engaged configuration, lock rotation of the case and a first side gear; and
   an actuation system configured to engage and disengage the locking clutch based on a steering angle;
   wherein the actuation system includes a piston that when actuated pushes a plurality of spherical balls radially inward to mate with recesses in the first side gear; and
   wherein the locking clutch includes the plurality of spherical balls.

2. The locking differential assembly of claim 1, wherein the actuation system includes a controller configured to:
   send commands to a hydraulic valve that is in hydraulic communication with a hydraulic actuator of the locking clutch.

3. The locking differential assembly of claim 2, wherein the controller includes instructions that when executed cause the controller to:
   disengage the locking clutch when the steering angle surpasses a threshold value.

4. The locking differential assembly of claim 2, wherein the controller includes instructions that when executed cause the controller to:
   disengage the locking clutch when a vehicle speed surpasses a threshold value.

5. The locking differential assembly of claim 1, wherein the actuation system includes a mechanical device configured alter a configuration of a hydraulic valve that is in hydraulic communication with a hydraulic actuator of the locking clutch.

6. The locking differential assembly of claim 5, wherein the mechanical device is coupled to a steering mechanism.

7. The locking differential assembly of claim 1, wherein the plurality of spherical balls are positioned radially inward from a spring which is coupled to the piston.

8. The locking differential assembly of claim 1, further comprising a plurality of pinion gears which mesh with the first side gear and a second side gear, wherein the first side gear is rotationally coupled to a first axle shaft and the second side gear is rotationally coupled to a second axle shaft.

9. The locking differential assembly of claim 1, wherein the locking differential assembly is included in an off-highway vehicle.

10. A method for operation of a locking differential assembly, comprising:
    disengaging a locking clutch in the locking differential assembly in response to a steering angle surpassing a threshold value;
    wherein the locking differential assembly includes:
      an input gear configured to rotationally couple to an upstream component;
      a case coupled to the input gear; and
      the locking clutch which is configured to, in an engaged configuration, lock rotation of the case and a first side gear;
    wherein the actuation system includes a piston that when actuated pushes a plurality of spherical balls radially inward to mate with recesses in the first side gear; and
    wherein the locking clutch includes the plurality of spherical balls.

11. The method of claim 10, wherein the locking differential assembly further comprises an actuation system configured to engage and disengage the locking clutch based on the steering angle.

12. The method of claim 11, wherein the actuation system includes a controller configured to change a position of a hydraulic valve which is in fluidic communication with a hydraulic actuator coupled to the locking clutch.

13. The method of claim 10, further comprising disengaging the locking clutch in response to a vehicle speed surpassing a threshold value.

14. The method of claim 10, further comprising engaging the locking clutch in response to the steering angle decreasing below the threshold value.

15. A locking differential assembly, comprising:
    an input gear configured to rotationally couple to an upstream component;
    a case coupled to the input gear;
    a locking clutch configured to, in an engaged configuration, lock rotation of the case and a first side gear;
    an actuation system including a hydraulic valve which is hydraulically coupled to a hydraulic actuator of the locking clutch;
    wherein the hydraulic actuator is configured to engage and disengage the locking clutch; and
    wherein the actuation system is configured to selectively disengage the locking clutch based on a steering angle and/or vehicle speed; and
    a controller that includes instructions that when executed cause the controller to:
      disengage the locking clutch in response to the steering angle exceeding a threshold value;
      disengage the locking clutch in response to the vehicle speed exceeding a threshold value; and
      engage the locking clutch in response to:

the steering angle decreasing below the threshold value; and the vehicle speed decreasing below the threshold value.

16. The locking differential assembly of claim 15, wherein the hydraulic actuator engages the locking clutch when a pressure in a chamber of the hydraulic actuator is greater than a threshold value.

17. The locking differential assembly of claim 15, wherein the locking clutch includes a plurality of spherical balls that are profiled to mate with recesses in the first side gear.

\* \* \* \* \*